(12) United States Patent
Quan et al.

(10) Patent No.: US 11,217,274 B2
(45) Date of Patent: Jan. 4, 2022

(54) HARD MAGNETIC STABILIZED SHIELD FOR DOUBLE (2DMR) OR TRIPLE (3DMR) DIMENSION MAGNETIC READER STRUCTURES

(71) Applicant: Headway Technologies, Inc., Milpitas, CA (US)

(72) Inventors: Junjie Quan, Fremont, CA (US); Glen Garfunkel, San Jose, CA (US); Yewhee Chye, Hayward, CA (US); Kunliang Zhang, Fremont, CA (US); Min Li, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 16/784,304

(22) Filed: Feb. 7, 2020

(65) Prior Publication Data
US 2020/0176024 A1    Jun. 4, 2020

Related U.S. Application Data

(62) Division of application No. 16/161,136, filed on Oct. 16, 2018, now Pat. No. 10,593,357, which is a (Continued)

(51) Int. Cl.
G11B 5/39 (2006.01)

(52) U.S. Cl.
CPC .......... *G11B 5/3912* (2013.01); *G11B 5/3932* (2013.01); *G11B 5/3951* (2013.01); *G11B 2005/3996* (2013.01)

(58) Field of Classification Search
None
See application file for complete search history.

(56) References Cited

U.S. PATENT DOCUMENTS 5,465,185 A   11/1995   Helm et al.
5,701,223 A   12/1997   Fontana, Jr. et al.
(Continued)

FOREIGN PATENT DOCUMENTS

DE   3535671      4/1987
JP   2007109807   4/2007

OTHER PUBLICATIONS

Co-pending U.S. Pat. No. HT14-029, U.S. Appl. No. 14/848,374, filed Sep. 9, 2015, "Shield Biasing Design for Magnetic Recording Head," by Glen Garfunkel et al., 15 pgs.
(Continued)

*Primary Examiner* — Craig A. Renner
(74) *Attorney, Agent, or Firm* — Saile Ackerman LLC; Stephen B. Ackerman

(57) ABSTRACT

A hard magnet stabilization scheme is disclosed for a top shield and junction shields for double or triple dimension magnetic reader structures. In one design, the hard magnet (HM) adjoins a top or bottom surface of all or part of a shield domain such that the HM is recessed from the air bearing surface to satisfy reader-to-reader spacing requirements and stabilizes a closed loop magnetization in the top shield. The HM may have a height and width greater than that of the top shield. The top shield may have a ring shape with a HM formed above, below, or within the ring shape, and wherein the HM stabilizes a vortex magnetization. HM magnetization is set or reset from room temperature to 100° C. to maintain a desired magnetization direction in the top shield, junction shield, and free layer in the sensor.

4 Claims, 8 Drawing Sheets

Related U.S. Application Data division of application No. 15/357,070, filed on Nov. 21, 2016, now Pat. No. 10,115,418.

(56) References Cited

U.S. PATENT DOCUMENTS

| | | | |
|---|---|---|---|
| 5,742,459 | A | 4/1998 | Shen et al. |
| 6,456,467 | B1 | 9/2002 | Mao et al. |
| 6,496,335 | B2 | 12/2002 | Gill |
| 6,801,409 | B2 | 10/2004 | Michel et al. |
| 6,801,410 | B2 | 10/2004 | Xue et al. |
| 7,180,712 | B1 | 2/2007 | Li et al. |
| 7,236,333 | B2 | 6/2007 | Macken |
| 7,239,570 | B2 | 7/2007 | Kumar et al. |
| 8,026,715 | B2 | 9/2011 | Pozidis et al. |
| 8,179,642 | B2 | 5/2012 | Kawamori et al. |
| 8,369,048 | B2 | 2/2013 | Miyauchi et al. |
| 8,462,467 | B2 | 6/2013 | Yanagisawa et al. |
| 8,472,147 | B2 | 6/2013 | Singleton et al. |
| 8,514,524 | B2 | 8/2013 | Wu et al. |
| 8,611,054 | B1 | 12/2013 | Shang et al. |
| 8,711,525 | B2 | 4/2014 | Singleton et al. |
| 8,824,106 | B1 | 9/2014 | Garfunkel et al. |
| 9,230,577 | B2 | 1/2016 | Zhang et al. |
| 9,263,068 | B1 | 2/2016 | Biskeborn et al. |
| 9,536,549 | B1 * | 1/2017 | Ge et al. ............... G11B 5/3912 |
| 9,601,138 | B1 | 3/2017 | Garfunkel et al. |
| 10,115,418 | B2 | 10/2018 | Quan et al. |
| 2006/0209470 | A1 * | 9/2006 | Ohta et al. ............ G11B 5/3932 360/319 |
| 2007/0081277 | A1 | 4/2007 | Folks et al. |
| 2007/0139826 | A1 | 6/2007 | Carey et al. |
| 2007/0195467 | A1 | 8/2007 | Gill |
| 2007/0242378 | A1 | 10/2007 | Ikegami et al. |
| 2008/0043370 | A1 | 2/2008 | Hirata et al. |
| 2009/0034130 | A1 | 2/2009 | Garfunkel et al. |
| 2009/0034132 | A1 | 2/2009 | Miyauchi et al. |
| 2009/0135529 | A1 | 5/2009 | Shimazawa et al. |
| 2009/0279213 | A1 | 11/2009 | Wu et al. |
| 2011/0051291 | A1 | 3/2011 | Miyauchi et al. |
| 2011/0069417 | A1 | 3/2011 | Kawamori et al. |
| 2011/0090595 | A1 | 4/2011 | Hirata et al. |
| 2012/0206830 | A1 | 8/2012 | Gao et al. |
| 2012/0281320 | A1 | 11/2012 | Singleton et al. |
| 2013/0171475 | A1 | 7/2013 | Kataoka et al. |
| 2014/0168822 | A1 | 6/2014 | Le et al. |
| 2015/0062751 | A1 | 3/2015 | Le et al. |
| 2019/0051321 | A1 | 2/2019 | Quan et al. |

OTHER PUBLICATIONS

"An Areal-Density Capability Study of SMR by using improved Write and Read Heads," by T. Kagami et al., Intermag 2011, IEICE Technical Committee Submission System, Conference Paper's Information, 3 pgs., Nov. 18, 2011.

"Two-Dimensional Magnetic Recording at 10 Tbits/in$^2$," by R.H. Victora, et al. IEEE Transactions on Magnetics, vol. 48, No. 5, May 2012, pp. 1697-1703.

"Future Options for HDD Storage," by Y. Shiroishi et al., IEEE Transacitons on Magnetics, vol. 45, No. 10, Oct. 2009, pp. 3816-3822.

"Analysis of Shingle-Write Readback Using Magnetic-Force Microscopy," by Fabian Lim et al., IEEE Transactions on Magnetics, vol. 46, No. 6, Jun. 2010, pp. 1548-1551.

"Shingled Magnetic Recording and Two-Dimensional Magnetic Recording," by Roger Wood, IEEE Magnetics Society, Santa Clara Valley Chapter, Hitachi Global Storage Technologies, Oct. 19, 2010, pp. 1-59.

* cited by examiner

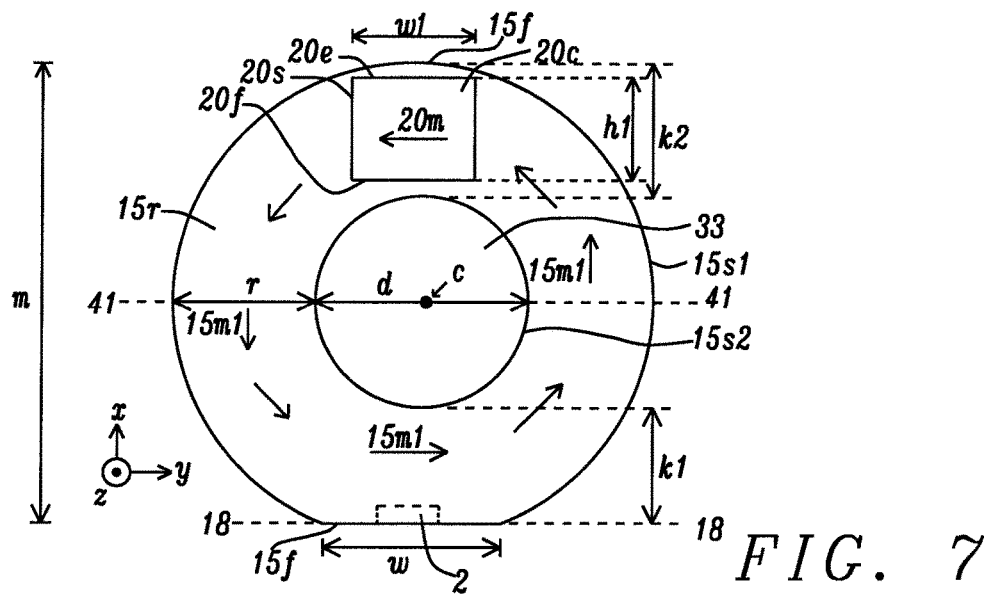
FIG. 7
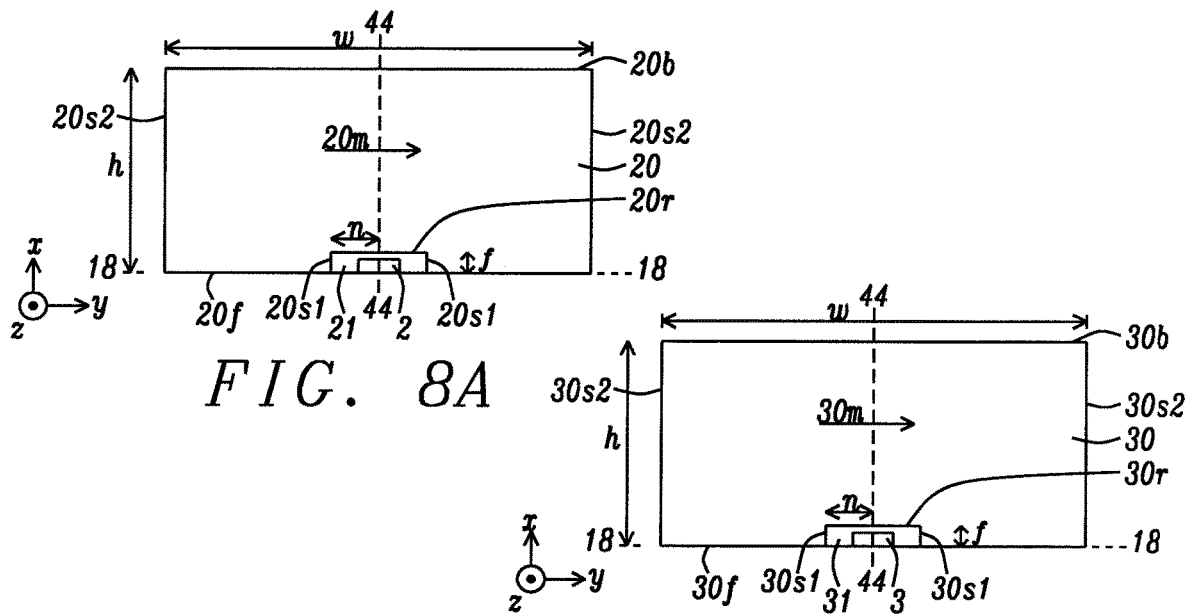
FIG. 8A
FIG. 8B
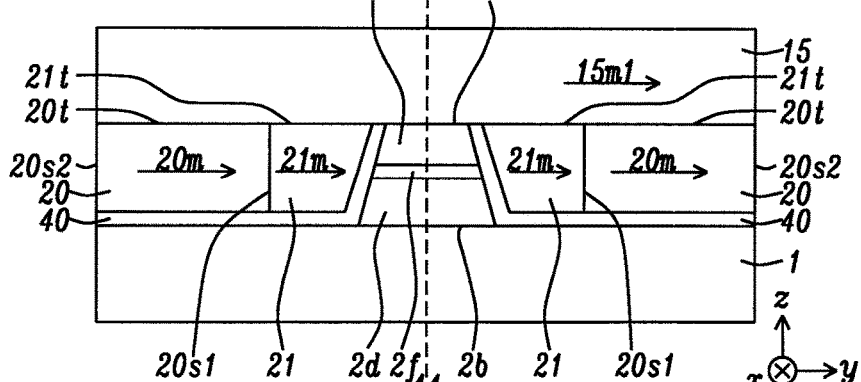
FIG. 9

HARD MAGNETIC STABILIZED SHIELD FOR DOUBLE (2DMR) OR TRIPLE (3DMR) DIMENSION MAGNETIC READER STRUCTURES

This is a divisional application of U.S. Ser. No. 16/161,136, filed on Oct. 16, 2018, which is a divisional application of U.S. Ser. No. 15/357,070, filed on Nov. 21, 2016 and now issued as U.S. Pat. No. 10,115,418, which are herein incorporated by reference in their entirety, and assigned to a common assignee.

RELATED PATENT APPLICATIONS

This application is related to the following: U.S. Pat. Nos. 8,369,048; 8,514,524, 8,824,106, U.S. patent application Ser. No. 14/848,376, filed on Sep. 9, 2015 and now issued as U.S. Pat. Nos. 9,601,138; and 9,230,577; assigned to a common assignee and herein incorporated by reference in their entirety.

TECHNICAL FIELD

The present disclosure relates to a stabilization scheme for shields between readers in 2DMR and 3DMR designs, and in particular to a hard magnet layer that stabilizes an overlying or underlying shield through exchange coupling thereby making the shield less susceptible to magnetization flipping to an incorrect state.

BACKGROUND

In a magnetic recording device in which a read head comprises a magnetoresistive (MR) sensor, there is a constant drive to increase recording density. One trend used in the industry to achieve this objective is to decrease the size of the MR sensor. Typically, the sensor stack has two ferromagnetic layers that are separated by a non-magnetic layer. One of the ferromagnetic layers is a reference or pinned layer wherein the magnetization direction is fixed by exchange coupling with an adjacent antiferromagnetic (AFM) pinning layer. The second ferromagnetic layer is a free layer with a magnetization that rotates in response to external magnetic fields, and is aligned either parallel or anti-parallel to the magnetization in the pinned layer to establish a "0" or "1" memory state. When an external magnetic field is applied by passing the MR sensor over a recording medium at an air bearing surface (ABS), the free layer magnetic moment may rotate to an opposite direction. A MR sensor may be based on a tunneling magnetoresistive effect where the two ferromagnetic layers are separated by a thin non-magnetic dielectric layer. A sense current is used to detect a resistance value which is lower in a "0" memory state than in a "1" memory state. In a CPP configuration, a sense current is passed from a top shield through the sensor layers to a bottom shield in a perpendicular-to-plane direction.

In a longitudinal biasing read head design, hard bias films of high coercivity are abutted against the edges of the sensor and particularly against the sides of the free layer. In other designs, there is a thin seed layer between the hard bias layer and free layer. By arranging for the flux flow in the free layer to be equal to the flux flow in the adjoining hard bias layer, the demagnetizing field at the junction edges of the aforementioned layers vanishes because of the absence of magnetic poles at the junction. As the critical dimensions for sensor elements become smaller with higher recording density requirements, the free layer becomes more volatile and more difficult to bias. Traditional biasing schemes using a hard magnet bias have become problematic due to randomly distributed hard magnetic grains within the hard bias layer.

In recent years, 2DMR and 3DMR configurations have become attractive from an areal density improvement standpoint. However, shield stability is more difficult to control in 2DMR and 3DMR schemes because of a requirement to shrink reader-to-reader spacing (RRS) and in view of repeated thermal treatments during fabrication that can readily flip the magnetization in the shields. Although an upper shield that is stabilized through antiferromagnetic (AFM) coupling provides good thermal stability in a single reader (1DMR) structure, repeated heat treatments on shields in a 2DMR or 3DMR process flow greatly increase shield instability and flip rate. In addition, shields that are stabilized with exchange coupling become less stable due to the reduced RRS requirement. Since top and bottom shields are commonly directly coupled or anti-ferromagnetically coupled to the junction shield that biases a free layer in the MR sensor, shield instability will directly translate into reader instability and will adversely impact signal to noise ratio (SNR) and bit error rate (BER). Accordingly, a new read head structure is needed wherein shield stability is improved in 2DMR and 3DMR configurations while maintaining acceptable SNR and BER.

SUMMARY

One objective of the present disclosure is to provide a stabilization scheme for a top shield in a MR sensor structure that also provides improved stability to a free layer in the MR sensor.

A second objective of the present disclosure is to provide a stabilization scheme according to the first objective that is compatible with reduced reader-to-reader spacing (RRS) requirements.

According to one embodiment of the present disclosure, these objectives are achieved by including a hard magnet (HM) layer that is recessed from the ABS and is coupled with one of the domains in a top shield. Preferably, the HM layer adjoins a portion of the bottom surface of the top shield to enable reduced RRS. However, in some embodiments, the hard magnet layer may adjoin a top surface of the top shield. In another embodiment, the HM layer is embedded in the top shield by directly replacing part or all of a magnetic domain. An advantage of incorporating a HM layer in a read head design as described herein is that the HM magnetization is easily set or reset at room temperature. Moreover, HM coupling to the top shield maintains the top shield magnetization in the correct direction. If an annealing process during reader fabrication inadvertently flips the top shield magnetization to an undesired direction, resetting the HM layer magnetization does not require an additional high temperature anneal to reset the top shield magnetization because the top shield reset will occur as a result of coupling to a reset HM layer.

The MR sensor includes a free layer formed in a plane that is orthogonal to the ABS and with a magnetic moment in a direction parallel to the ABS. The MR sensor has a bottom surface formed on a bottom shield, a top surface that adjoins the top shield, and sidewalls connecting the top and bottom surfaces. There is a non-magnetic insulation layer adjoining the sidewalls of the MR sensor and a second section thereof that extends along a top surface of the bottom shield. The second section of insulation layer is formed in a plane that is parallel to the planes of the sensor layers and serves as a substrate for side shields (junction shields) that are preferably comprised of a single ferromagnetic layer.

From a top-down view, the top shield has a cross-track width (w), and a height (h) orthogonal to the ABS that are substantially greater than the cross-track width and height dimensions, respectively, of the MR sensor. According to one embodiment where the top shield has a rectangular shape, magnetization in the top shield forms a closed loop or enclosed state. Magnetization has a first (cross-track) direction in a first portion (domain) at the ABS, a second direction orthogonal to the ABS in a second domain proximate to a first top shield side, a third direction opposite to the first direction in a third domain at a top shield backside, and a fourth direction opposite to the second direction in a fourth domain proximate to a second top shield side. In one aspect, the first domain extends orthogonal from the ABS to a height (½ h) at a backside center section thereof, and the third domain extends from the backside center section of the first domain to height h.

The first and third domains may have a substantially trapezoidal shape. In various embodiments, a HM layer has a shape substantially equivalent to that of the third domain, and contacts a top or bottom surface of the top shield third domain or is formed within the top shield. Thus, HM magnetization is set in the third direction and maintains magnetization in the top shield third domain in the third direction. Since the top shield has a closed loop magnetization, magnetization in the other top shield domains is maintained in the desired direction by influence from the third top shield domain thereby establishing top shield magnetic stability.

According to another embodiment, the top shield has two rectangular shaped domains that are adjoined along a side aligned parallel to the ABS. A front domain has a magnetization that is parallel to the ABS in the first direction, and a back domain has a magnetization that is opposite to the first direction. Each of the front and back domains have a cross-track width "w", and the back domain has a backside at height "h" from the ABS. The HM layer preferably adjoins a bottom surface of the top shield back domain and has a cross-track width greater than "w", and a height that extends more than ½ h from a front side to a backside that is at a height greater than "h" from the ABS to avoid edge magnetostatic coupling. The HM layer front side is recessed a distance of about "½ h" from the ABS.

In an alternative embodiment, the top shield has a shape substantially in the form of a ring with an inner diameter "d" filled with an isolation material, and radius "r" between and an inner side and outer side from a top-down view. A front side of the ring abuts the ABS above the MR sensor. Magnetization within the ring has a stable vortex state with a clockwise or counterclockwise direction. Preferably, there is a HM layer having a rectangular or trapezoidal shape, for example, which adjoins a portion of top shield bottom surface. Magnetization within the HM layer is set or reset in a direction that maintains the desired clockwise or counterclockwise magnetization in the top shield ring shape.

In another embodiment that features a fully coupled top shield design, a HM layer having a substantially rectangular shape adjoins essentially all of the top shield bottom surface except in a region over the MR sensor and junction shields that adjoin the MR sensor sidewalls. The HM layer has a thickness equivalent to that of the MR sensor and junction shields at the ABS, and extends in a cross-track direction from an outer side of each junction shield to a far side of the read head structure. In a 2DMR layout, an isolation layer is formed between a first top shield that is above a first MR sensor, and a second bottom shield that is below a second MR sensor.

For a 3DMR structure, a first HM layer may be employed to stabilize a first top shield on a bottommost MR sensor, a second HM layer stabilizes a second top shield in a middle MR sensor, and a third HM layer may or may not be used to stabilize a third top shield on the uppermost MR sensor in the sensor stack.

The present disclosure also includes a method involving a sequence of process steps of forming a HM layer in the fully coupled top shield design.

BRIEF DESCRIPTION OF THE DRAWINGS

FIG. 7 is a top-down view of a top shield with a circular shape that is stabilized by coupling with a hard magnet layer according to an embodiment of the present disclosure.

FIGS. 8A-8B are top-down views of hard magnetic layers that are each used to stabilize an overlying top shield in a fully coupled scheme in a 2DMR structure according to an embodiment of the present disclosure.

FIG. 9 is an ABS view of a hard magnet layer that is coupled to an overlying top shield in a 1DMR structure having a MR sensor and junction shields according to another embodiment of the present disclosure.

DETAILED DESCRIPTION

Figure 1:
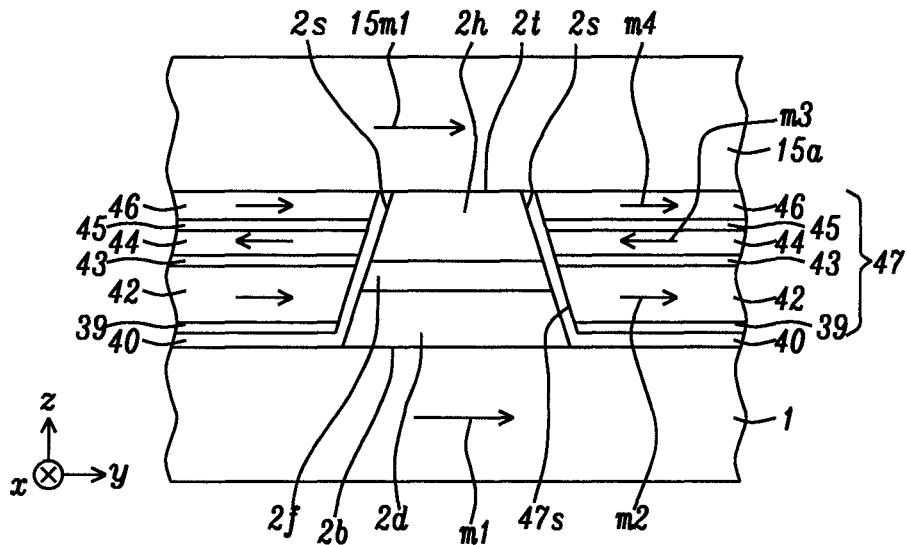
FIG. 1 is an ABS view showing a MR sensor formed between top and bottom shields, and stabilized side shields with antiferromagnetic coupling are used to longitudinally bias a free layer according to a prior art design.

The present disclosure is a stabilized shield design for a magnetic read head wherein a hard magnet layer with a magnetization that is set or reset around room temperature is coupled to a top shield, for example, to preserve a closed loop magnetization therein. The stabilized shield is responsible for maintaining a stable magnetization direction within an adjacent junction shield that translates into improved MR sensor stability, better SNR, and reduced BER. In the drawings, the y-axis is a cross-track direction, the z-axis is a down-track direction, and the x-axis is in a direction orthogonal to the ABS and towards a back end of the read head. The stabilized shield design described herein is not limited to a particular read head structure, and is especially effective in 2DMR and 3DMR configurations where a plurality of thermal treatments are employed during fabrication. The term "front side" refers to a side of a layer that faces the ABS or is at the ABS while "backside" is a side of the layer opposite to the front side.

Referring to FIG. 1, a portion of a read head previously fabricated by the inventors and disclosed in related U.S. Pat. No. 9,230,577 is depicted. The read head is formed on a substrate (not shown) that may be comprised of AlTiC (alumina+TiC). The substrate is typically part of a slider formed in an array of sliders on a wafer. After the read head or combined read head/write head is fabricated, the wafer is sliced to form rows of sliders. Each row is typically lapped to afford an ABS before dicing to fabricate individual sliders that are used in a magnetic recording device. Typically, the substrate has an uppermost insulation layer made of a dielectric material such as alumina.

A bottom shield 1 also referred to as the S1 shield is formed on the substrate and may be comprised of NiFe, CoFe, CoFeN, or CoFeNi, or other magnetic materials used in the art. A MR sensor having a lower layer 2d, middle free layer 2f, and upper layer 2h is formed on a center section of the bottom shield. Sidewalls 2s connect a bottom surface 2b with the top surface 2t of the MR sensor. There is a non-magnetic isolation layer 40 formed along the sidewalls 2s and on portions of the bottom shield that are not covered by the MR sensor. On each side of the MR sensor, side shields 47 are stabilized through an antiferromagnetic (AFM) coupling scheme wherein a lower ferromagnetic (FM) layer 42 is AFM coupled to middle FM layer 44 through a first AFM coupling layer 43, and the middle FM layer is AFM coupled to a top FM layer 46 through a second AFM coupling layer 45. Moreover, top shield 15a is directly coupled to the top FM layer such that magnetization 15m1 in the top shield is aligned in the same direction as magnetization m4 in FM layer 46. Because of AFM coupling, magnetization m2 in the lower FM layer is in the same direction as m4 but is opposite to the m3 direction. AFM coupling layers are made of Ru, Rh, RhRu, Re, Ir, Mo, or other metals or alloys that promote AFM coupling between FM layer 42 and FM layer 44, and between the FM layer 44 and FM layer 46, respectively. Lower FM layer 42 is formed on seed layer 39 and is primarily responsible for providing longitudinal biasing to free layer 2f.

In the MR sensor of FIG. 1, layer 2h comprises at least a capping layer, and layer 2d includes a reference layer with a fixed magnetization direction, and a non-magnetic spacer (not shown) between the reference layer and free layer 2f. Layer 2d may also include a bottommost seed layer, and an antiferromagnetic (AFM) layer such as IrMn or another Mn alloy may be formed on a side of the reference layer that faces away from the free layer to pin the magnetization direction in the reference layer. In other embodiments, the AFM layer (not shown) may be recessed behind the MR sensor stack or embedded in a back portion of the bottom shield 1 to satisfy reduced RRS requirements. The non-magnetic spacer may be comprised of one or more metal oxides, metal oxynitrides, or metal nitrides to provide a tunneling magnetoresistive effect.

Note that the reader structure shown in FIG. 1 represents a so-called 1DMR configuration. In another 1DMR design that we disclosed in related U.S. Pat. No. 8,369,048, the reference layer (RL) is AFM coupled to a top magnetic layer in a bottom shield, and the free layer (FL) is AFM coupled to a bottom magnetic layer in a top shield such that RL magnetization is anti-parallel to that of the FL in the absence of a bias magnetic field or external magnetic field. Also, a hard bias layer is positioned behind the MR sensor stack to generate a bias field that is orthogonal to the ABS.

In yet another 1DMR design that we disclosed in related U.S. Pat. No. 8,514,524, the top shield is stabilized through an antiferromagnetic (AFM) coupling scheme and has an uppermost AFM layer to pin the upper ferromagnetic (FM2) layer in a FM1/Ru/FM2/AFM top shield configuration where the Ru layer is responsible for AFM coupling between the bottom ferromagnetic (FM1) layer and FM2 layer. Although all of our previous shield stabilization schemes, and especially the AFM biased top shield afford good thermal stability in a 1 DMR layout, we have observed that repeated heat treatments on shields in a 2DMR or 3DMR fabrication greatly increases shield thermal instability and magnetization flip rate. We have disclosed examples of 2DMR designs in related U.S. Pat. No. 8,824,106 and in U.S. patent application Ser. No. 14/848,376 where a conventional biasing layer is used to stabilize an adjacent free layer in each sensor element.

As disclosed in various embodiments depicted in FIGS. 3A-7, we have discovered schemes where a hard magnet layer that is recessed behind an ABS to satisfy RRS requirements is advantageously used to stabilize a top shield in one or more read heads. Although the exemplary embodiments refer to a 2DMR design, those skilled in the art will appreciate that any of the HM stabilization schemes disclosed herein may also be incorporated in a 3DMR structure to stabilize one or more top shields.

Figure 2:
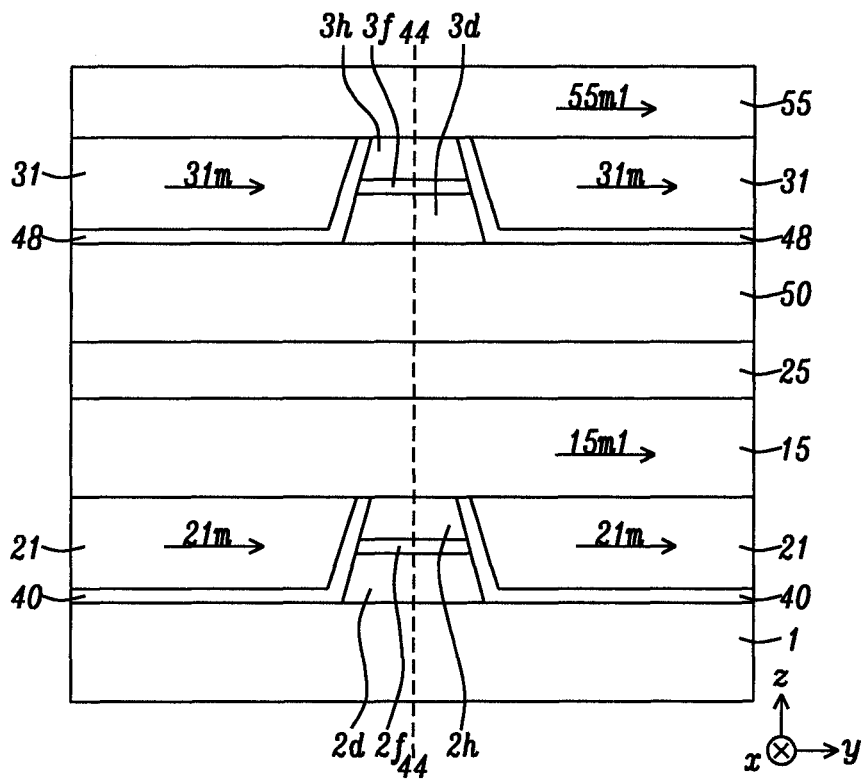
FIG. 2 shows an ABS view of a 2DMR read head structure that includes two MR sensors each having junction shields and a hard magnet layer formed according to an embodiment of the present disclosure.

An ABS view of a 2DMR structure that applies to all of the recessed HM layer embodiments disclosed herein is illustrated in FIG. 2 where a first reader is comprised of a first MR sensor that has layers 2d, 2f, 2h formed between top shield 15 and bottom shield 1 as described previously. Side shields 21 are formed on either side of the first MR sensor and have a magnetization 21m in a (+) y direction, for example, which is maintained by ferromagnetic coupling with magnetization 15m1 in the top shield. Above top shield 15 is an isolation layer 25 that magnetically separates the first MR sensor from the second MR sensor comprised of bottom layer 3d, free layer 3f, and upper layer 3h where layers 3d and 3h may have the same composition and function as layers 2d and 2h, respectively. The second MR sensor is formed between a second bottom shield 50 and a second top shield 55. A second insulation layer 48 adjoins the sidewalls of the second MR sensor. Side shields 31 formed on the second insulation layer have a magnetization 31*m* and are employed to provide a longitudinal bias to the free layer 3*f* magnetization direction (same as 31*m*). Magnetization 31*m* is also in the same direction as magnetization 55*m* in the second top shield because of ferromagnetic coupling. Preferably, the second MR sensor is aligned above the first MR sensor such that center plane 44 bisects each of the aforementioned MR sensors. The center plane is orthogonal to the ABS.

Figure 3A:
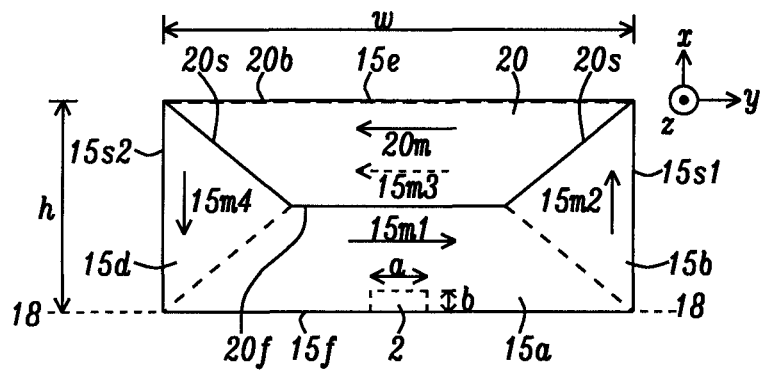
FIGS. 3A-3B are top-down views of the top shields in the 2DMR structure of FIG. 2 wherein a magnetic domain adjoins a surface of a hard magnet layer for magnetization stabilization according to an embodiment of the present disclosure.

According to a first embodiment of the present disclosure, a top-down view of the top shield 15 in the first reader with overlying layers removed is shown in FIG. 3A. A key feature is that a hard magnet (HM) layer 20 is formed on a top surface of a magnetic domain in top shield 15. In view of reduced RRS requirements in 2DMR and 3DMR structures, the HM layer is preferably recessed behind the ABS.

In the exemplary embodiment in FIG. 3A, magnetization 20*m* is set in a negative (y) direction and maintains magnetization 15*m*3 in an underlying top shield third domain in the event of an external magnetic field disturbance. In turn, magnetization 15*m*3 maintains a closed magnetic loop involving magnetization 15*m*1 in a positive (y) direction in a first magnetic domain 15*a* having a front side 15*f* at the ABS 18-18, magnetization 15*m*2 in a direction orthogonal and away from the ABS in a second domain 15*b* with side 15*s*1, and magnetization 15*m*4 in a direction orthogonal and toward the ABS in a fourth magnetic domain 15*d* with side 15*s*2. Magnetization 20*m* may be easily set or reset from room temperature to about 100° C. to avoid using substantially higher temperatures that may undesirably flip magnetizations 15*m*1-15*m*4 in a direction opposite to their preset directions. The HM layer does not necessarily have a trapezoidal shape but may be a rectangle, triangle, square, or other polygon instead. Preferably, a HM layer shape is selected that essentially matches that of the adjoining top shield domain to provide optimum magnetic coupling thereto.

According to one aspect, the top shield has a rectangular shape with cross-track width w between sides 15*s*1 and 15*s*2, and height h between front side 15*f* and backside 15*e*. The first domain 15*a* and third domain 15*c* (not shown below HM layer 20) each have a trapezoidal shape and adjoin each other at a height around ½ h from the ABS 18-18. The present disclosure also anticipates that the top shield may have a square, trapezoidal, triangular, or another polygonal shape as long as the magnetic domains therein form a closed loop. In the exemplary embodiment, HM layer 20 has substantially the same trapezoidal shape as the underlying third domain such that backside 20*b* overlays on third domain backside 15*e*, and front side 20*f* is recessed about ½ h from the ABS. Diagonal sides 20*s* connect the front and backsides of the HM layer. As a result, magnetic coupling is enhanced between the third domain and HM layer. Each of the first MR sensor 2 and second MR sensor 3 have a cross-track width a and height b substantially less than w and h, respectively, in top shield 15 and second top shield 55.

Figure 3B:
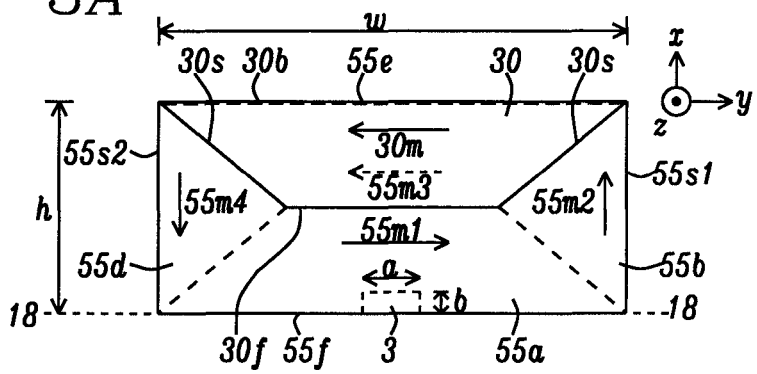

Typically, the top shield 55 in the second read head is less susceptible to magnetization flipping and does not necessarily require a HM stabilization scheme as described previously with respect to the first read head in FIG. 3A. However, the present disclosure anticipates an embodiment where the top shield in both of the first and second read heads is stabilized by a HM layer. As depicted in FIG. 3B, the top shield in the second read head in a 2DMR design may have substantially the same top-down shape and properties as that of the first top shield described earlier. In particular, top shield 55 has a rectangular shape with cross-track width w between sides 55*s*1 and 55*s*2, and a height h between front side 55*f* and back side 55*e*. The first domain 55*a* and third domain 55*c* (not shown below second HM layer 30) each have a trapezoidal shape and adjoin each other at a height ½ h from the ABS 18-18. Moreover, the second HM layer 30 has substantially the same trapezoidal shape as the underlying third domain such that backside 30*b* overlays on the third domain backside 55*e*, and front side 30*f* is recessed about ½ h from the ABS. Diagonal sides 30*s* connect the front and backsides of the HM layer.

The recessed second HM layer 30 is formed on a top surface of a domain in second top shield 55, and has magnetization 30*m* that maintains magnetization 55*m*3 in the underlying third domain in the second top shield in the event of an external magnetic field disturbance. In turn, magnetization 55*m*3 maintains a closed magnetic loop involving magnetization 55*m*1 in a positive (y) direction in a first magnetic domain 55*a* having a front side 55*f* at the ABS 18-18, magnetization 55*m*2 in a direction orthogonal and away from the ABS in a second domain 55*b* with side 55*s*1, and magnetization 55*m*4 in a direction orthogonal and toward the ABS in a fourth magnetic domain 55*d* with side 55*s*2.

Figure 5A:
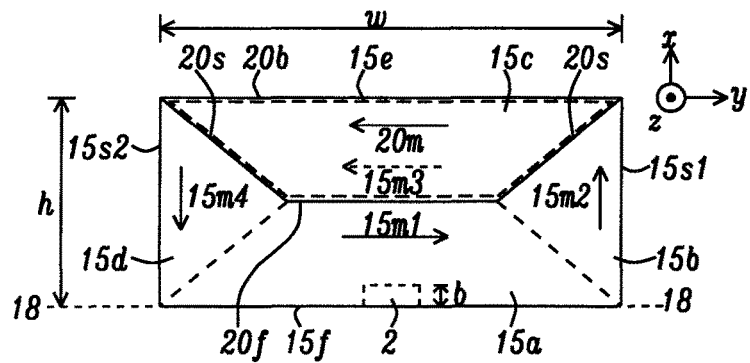
FIG. 5A shows a top-down view and FIG. 5B depicts a cross-sectional view wherein the HM layer in FIG. 3A is shifted from above a top shield domain to below the top shield domain according to another embodiment of the present disclosure.

Magnetic shields 1, 15, 50, 55 and junction shields 21, 31 are comprised of CoFe, CoFeNi, CoFeN, or NiFe, for example, while HM layers 20, 30 are preferably made of a material such as CoPt, CoCrPt, or FePt wherein a magnetization is readily set or reset at a temperature between room temperature (RT) and about 100° C. Preferably, each HM layer has a down-track thickness of 100 to 200 nm when formed above the top shield (FIGS. 3A-3B) or below the top shield (FIG. 5A). Furthermore, the HM layer is made of a material with a substantially higher magnetization saturation×thickness (Mst) value than the magnetic material in the top shields.

Figure 4A:
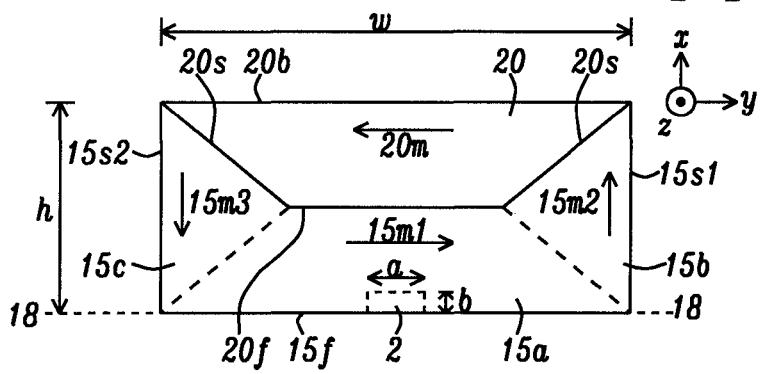
FIGS. 4A-4B are top-down views of the top shields in the 2DMR structure of FIG. 2 wherein a magnetic domain is replaced by a hard magnet layer for magnetic stabilization according to another embodiment of the present disclosure.

In a second embodiment illustrated in FIG. 4A, the HM layer scheme of FIG. 3A is modified by directly replacing a magnetic domain in top shield 15 with a HM layer. In this case, HM layer 20 has a minimum thickness of around 100 nm but may have a maximum thickness substantially the same as the thickness of the top shield first domain 15*a*, second domain 15*b*, and fourth domain 15*d*. The HM layer replaces the third domain in the first top shield to form a rectangular shape of cross-track width w and height h with the aforementioned three domains. As a result, the HM layer adjoins the first domain at front side 20*f*, adjoins the second domain at a first diagonal side 20*s*, and adjoins the fourth domain at a second diagonal side 20*s*. Preferably, the HM layer has a top surface that is coplanar with a top surface of the first, second, and fourth domains. Magnetization 20*m* is responsible for preventing magnetizations 15*m*1, 15*m*2, and 15*m*4 from flipping to a direction that is opposite to the preset direction thereby stabilizing the top shield 15, side shield 21, and free layer 2*f* in first MR sensor in FIG. 2.

Figure 4B:
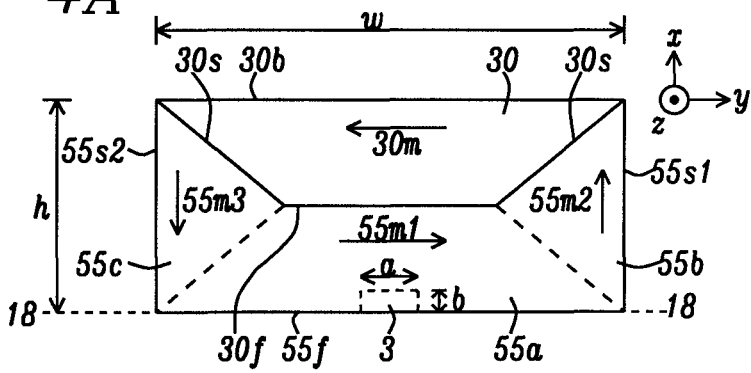

In an alternative embodiment shown in FIG. 4B, the first read head is stabilized by HM layer 20 as previously described in FIG. 4A. Moreover, the second top shield 55 in the second read head is stabilized by a second HM layer 30 that preferably has a top surface that is coplanar with that of the first domain 55*a*, second domain 55*b*, and fourth domain 55*d*. The second HM layer replaces the third domain in the second top shield to form a rectangular shape of cross-track width w and height h with the aforementioned three domains. As a result, the second HM layer adjoins the first domain at front side 30*f*, adjoins the second domain at a first diagonal side 30*s*, and adjoins the fourth domain at a second diagonal side 30*s*. Magnetization 30*m* is responsible for preventing magnetizations 55*m*1, 55*m*2, and 55*m*4 from flipping to a direction that is opposite to the preset direction thereby stabilizing the second top shield 55, side shield 31, and free layer 3*f* in the second MR sensor in FIG. 2.

The present disclosure encompasses another embodiment shown in FIG. 5A where the HM layer 20 in FIG. 3A is shifted from above a third domain in the top shield 15 to below the third domain 15*c*. In other words, HM layer 20 has essentially the same trapezoidal shape as the third domain 15*c* and adjoins a bottom surface thereof such that backside 20*b* is below top shield backside 15*e*, and front side 20*f* is about ½ h from top shield front side 15*f*. It should be understood that the second HM layer when present may be shifted from above a domain (i.e. third domain in FIG. 3B) to adjoining a bottom surface of the domain.

Figure 5B:
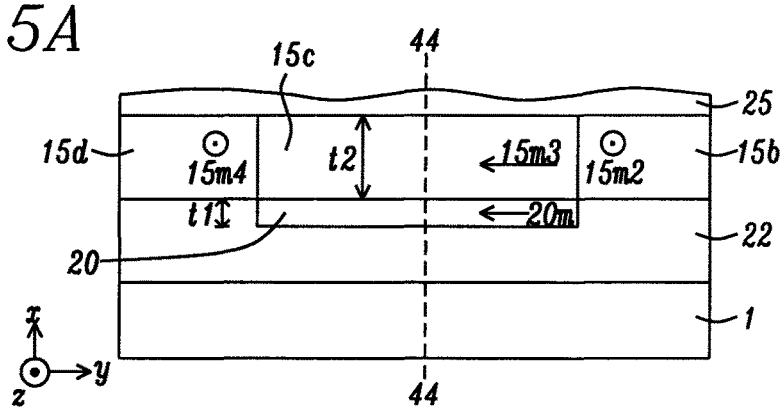

In FIG. 5B, a cross-sectional view of the HM stabilization scheme corresponding to FIG. 5A in the first read head is shown along a plane that is parallel to the ABS 18-18 and includes front side 20*f* of HM layer 20. The HM layer has down-track thickness t1 less than thickness t2 of magnetic domains 15*b*-15*d*, and is formed within an isolation layer 22 that is behind the junction (side) shield 21 and first MR sensor (layers 2*d*, 2*f*, 2*h*) in FIG. 2.

Figure 6A:
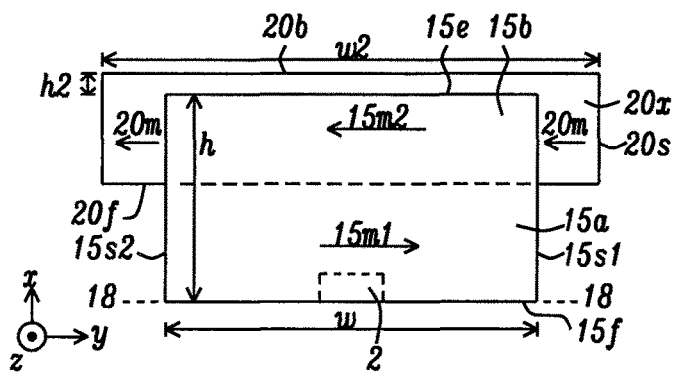
FIGS. 6A-6B are top-down views of the top shields in the 2DMR structure of FIG. 2 wherein a top shield magnetic domain adjoins a top surface of a hard magnet layer that has a greater cross-track width and height than the magnetic domain according to another embodiment of the present disclosure.

According to another embodiment depicted in FIG. 6A that represents a modification of the shield stabilization structure shown in FIG. 5A, the top shield retains the cross-track width w and height h. In this case, the top shield has a first domain 15*a* at the ABS with a backside about ½ h from the ABS 18-18, and a second domain 15*b* adjoining the backside of the first domain and having a backside 15*e*. Both of the domains share a first side 15*s*1 and a second side 15*s*2 that are orthogonal to the ABS. A key feature is that the HM layer 20*x* has an area bounded by front side 20*f*, backside 20*b*, and sides 20*s* that is enlarged with respect to HM layer 20 in the previous embodiments. Preferably, HM layer 20*x* has a backside at a height of (h+h2) that is greater than h, and a width w2 that is larger than w. Note that front side 20*f* is maintained at height ½ h. However, backside 20*b* is now a distance h2±½ h from the front side 20*f*. The HM layer has a square shape from a top-down view when the height (h2+½h) equals width w2 as shown in FIG. 6E, and has a rectangular shape when the height is unequal to the width. In the exemplary embodiment, each side 20*s* preferably extends a distance greater than ½ w from first MR sensor 2 in a cross-track direction. According to another embodiment shown in FIG. 6D where sides 20*s* are not parallel to each other, the HM layer has a trapezoidal shape. In other embodiments, HM layer 20*x* maintains a width w but has height (½ h+h2), or HM layer 20*x* maintains height h but has width w2 as depicted in FIG. 6C.

Magnetization 15*m*1 in the first top shield domain 15*a* is opposite to magnetization 15*m*2 in the second top shield domain 15*b*, and magnetization 20*m* in HM layer 20*x* is preferably aligned in the same cross-track direction as 15*m*2 in order to maintain 15*m*1 (and 15*m*2) in their preset directions in a closed loop thereby preventing the magnetizations from flipping to an incorrect state (direction). One of the advantages of the so-called "extended" HM layer design in FIG. 6A is to minimize edge magnetostatic coupling that competes with HM layer exchange coupling with the top shield domain 15*b*.

Figure 6B:
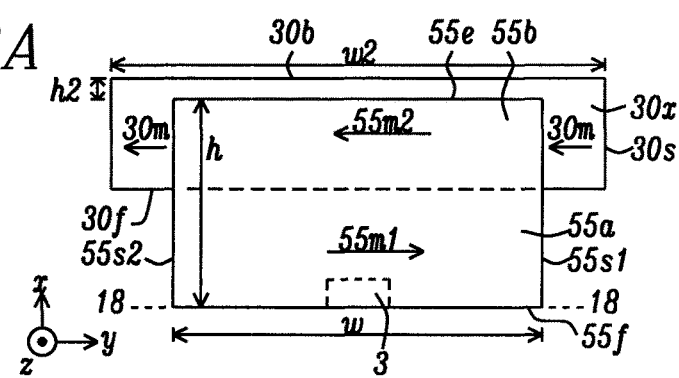
Figure 6C:
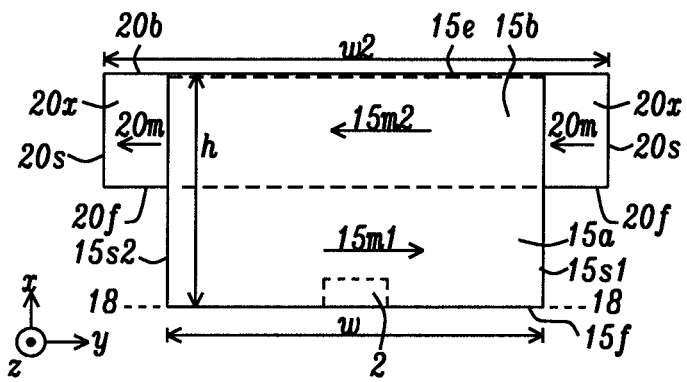
FIG. 6C is a top-down view of a top shield in a 2DMR structure wherein a top shield magnetic domain adjoins a top surface of a hard magnet (HM) layer that has a rectangular shape and a greater cross-track width than the magnetic domain according to another embodiment of the present disclosure.
Figure 6D:
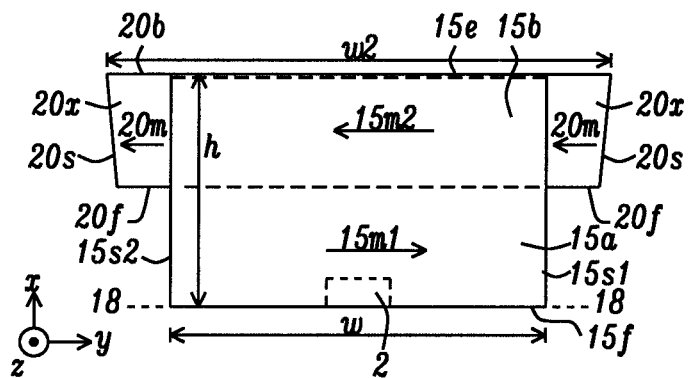
FIG. 6D is a modification of the embodiment in FIG. 6C where the HM layer has a trapezoidal shape.
Figure 6E:
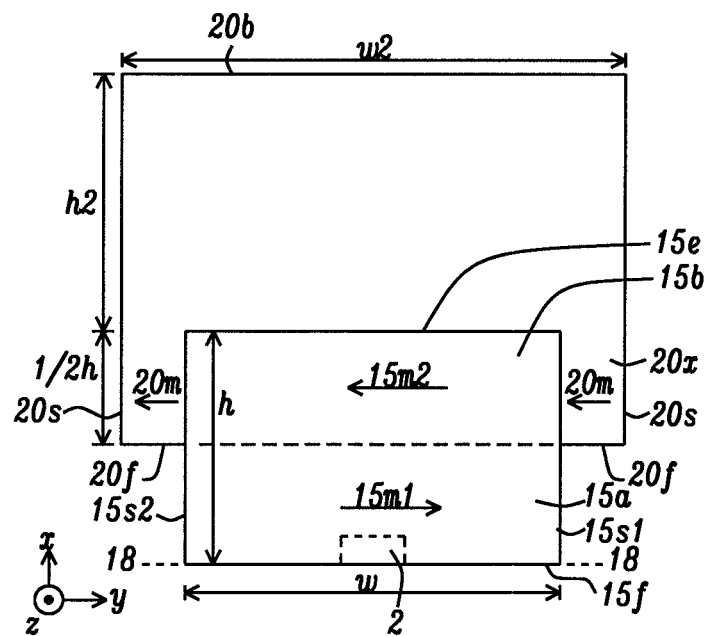
FIG. 6E is a modification of the embodiment in FIG. 6A where the HM layer has a square shape.

The present disclosure also anticipates an embodiment where in addition to the stabilization scheme for top shield 15 shown in FIG. 6A, the second top shield 55 may be stabilized by an extended HM layer 30*x* as shown in FIG. 6B. HM layer 30*x* has a backside 30*b* of width w2 between sides 30*s*, front side 30*f* that is ½ h from the ABS 18-18, and backside 30*b* at height (h2±½ h) from the front side such that the area of HM layer 30*x* is greater than that of (h×w) in the second top shield from a top-down view. Magnetization 55*m*1 in a top shield domain 55*a* at the ABS is opposite to magnetization 55*m*2 in a top shield domain 55*b* with backside 55*e*. Magnetization 30*m* in HM layer 30*x* is preferably aligned in the same cross-track direction as 55*m*2 in order to maintain 55*m*1 (and 55*m*2) in their preset directions, and provide magnetic stability to the second top shield during thermal excursions.

As illustrated by the top-down view in FIG. 7, the present disclosure also encompasses a hard magnet stabilization scheme of a top shield 15*r* having a substantially ring shape with a center portion that is filled with an isolation layer 33. The center portion contacts inner side 15*s*2 of the ring shape and has a cross-track width (diameter d) at a plane 41-41 formed parallel to the ABS and that passes through center point C of the center portion. The ring shape has a cross-track width r that is a plurality of microns between the outer side 15*s*1 and inner side 15*s*2 at plane 41-41. Preferably d is greater than r, but in some embodiments, the relationship r≥d may be acceptable. The ring shaped top shield has a front side 15*f* having a cross-track width w at the ABS 18-18 and above the first MR sensor 2. Magnetization 15*m*1 forms a vortex around the center and thus provides an optimum stable state, which increases stability of reader response. In other embodiments, other closed shapes such as an ellipse, square, rectangle, or polygon may replace the ring shape. A key feature is that all of the closed shapes have an open center portion and a vortex magnetization around the center portion.

In the exemplary embodiment, a HM layer 20*c* may be formed on a top surface, bottom surface, or within a portion of the ring shaped top shield. The HM layer has height h1 between front side 20*f* and backside 20*e*, and width w1 between two sides 20*s*. Because of the closed loop magnetization 15*m*1, the HM layer placement (coupling location) may be anywhere in the ring between the inner side 15*s*2 and outer side 15*s*1. The HM shape is not limited to a square, rectangle, or trapezoid. When the HM layer is within a portion of the top shield, the HM layer and top shield magnetizations form a vortex magnetization. In other embodiments, magnetization 20*m* in the HM layer is set in a direction that aligns with 15*m*1 and thereby maintains the top shield magnetization in the preset direction. As shown in FIG. 7, top shield 15*r* may have a substantially circular shape. Alternatively, the top shield shape may be an ellipse where the height m between the ABS 18-18 and a point 15*t* on the outer side that is farthest from the ABS is unequal to the cross-track width (d+2r) between points on the outer side of the ring shape on plane 41-41. In other embodiments, the ring shape may be asymmetrical in that the distance between the inner and outer sides is not constant in regions behind the ABS. For example, distance k2 between the inner side and outer side in a back portion of the ring may be unequal to r in a mid section of the ring at plane 41-41. In some embodiments, the height k1 between front side 15*f* and a point on the inner side behind MR sensor 2 is less than k2.

According to one embodiment, the shape of the HM layer 20*c* is contained between the inner side 15*s*2 and outer side 15*s*1. In other embodiments, a portion of the HM layer may extend beyond one or both sides 15*s*1, 15*s*2, as long as magnetization direction 15*m*1 is not disturbed. Preferably, the front side 20*f* is not at the ABS in order to satisfy a reduced RRS requirement for 2DMR (and 3DMR) designs. In a preferred embodiment, a HM layer is employed to stabilize only the first top shield in a 2DMR scheme. For a 3DMR structure, a first HM layer may be used to stabilize the first top shield while a second HM layer stabilizes a second top shield. In other words, a HM layer is generally not needed to stabilize the second top shield in a 2DMR structure or a third top shield (not shown) in a 3DMR layout.

In an alternative embodiment for a 2DMR scheme, a second HM layer (20c copy not shown) that has substantially the same shape and size as the first HM layer 20c may be used to stabilize a second top shield with a ring shape or closed loop shape that supports a vortex magnetization as previously described with regard to top shield 15r. Accordingly, the present disclosure anticipates a 2DMR scheme wherein one or both of the top shield and second top shield are comprised of a ring shape described herein and are stabilized by a HM layer. In other words, top shield 15 in the ABS view of FIG. 2 may be replaced by ring shaped shield 15r of this embodiment, and a second ring shaped shield having essentially the same structure as shield 15r may replace second top shield 55.

Figure 16:
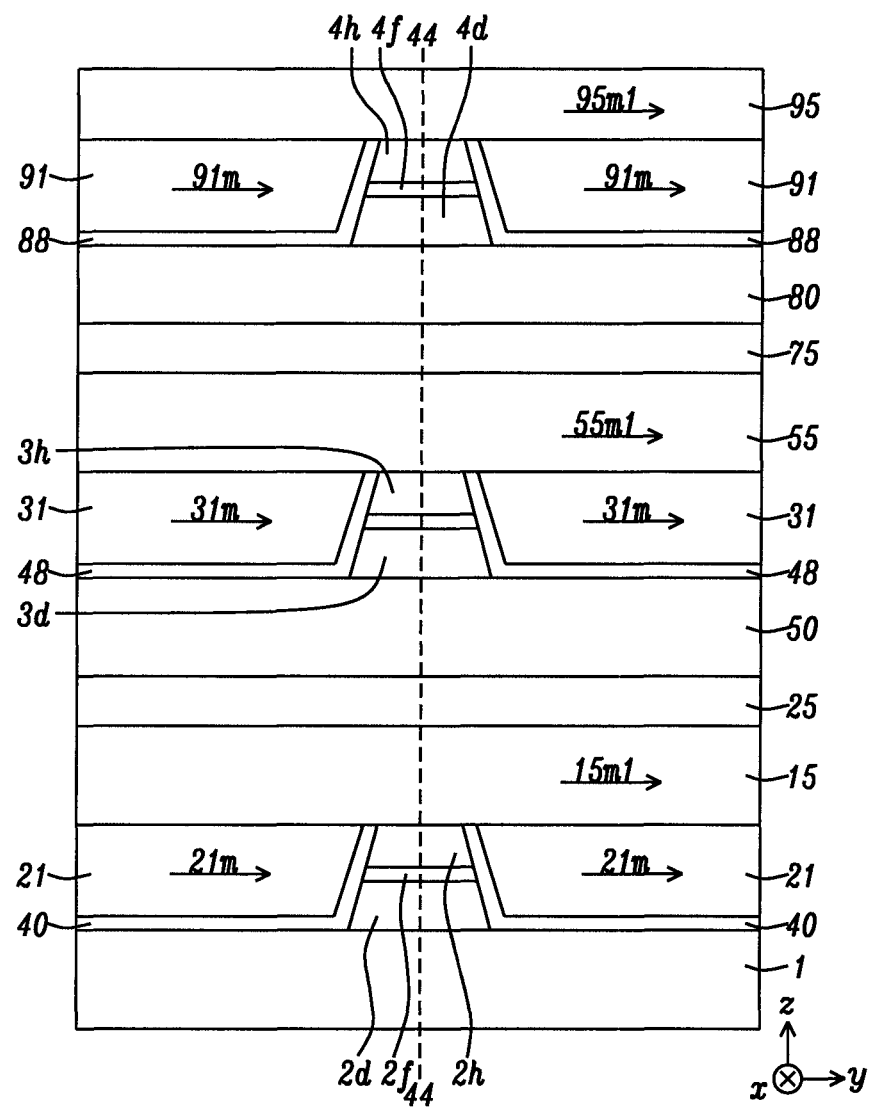
FIG. 16 is an ABS view of a 3DMR structure wherein one or more top shields are stabilized by a HM layer according to an embodiment of the present disclosure.

In another embodiment depicted in FIG. 16, a 3DMR structure is illustrated wherein the 2DMR stack of layers shown in FIG. 2 is modified by forming a second isolation layer 75 on the second top shield 55, a third bottom shield 80 on the second isolation layer, a third MR sensor comprised of bottom layer 4d, third free layer 4f, and top layer 4h on the third bottom shield, and a third top shield 95 on the third MR sensor. A third junction shield 91 having magnetization 91m is formed adjacent to the third MR sensor and separated therefrom by isolation layer 88. Preferably, first HM layer 20 (or 20x or 20c) is employed to stabilize top shield 15, and second HM layer 30 (or 30x or 20c or the like) is used to stabilize the second top shield 55 since the first and second top shields are more susceptible to magnetization flipping than the third top shield in a 3DMR design. Nevertheless, in some embodiments, a third HM layer (not shown) formed according to an embodiment of the present disclosure may adjoin a top or bottom surface of the third top shield 95, or may be formed within the third top shield for stabilization purposes. The third top shield has magnetization 95m1 aligned in the same direction as magnetization 91m.

Referring to FIG. 8A, the present disclosure also encompasses a whole shield coupling design where a HM layer contacts essentially all of a top shield bottom surface except in a region proximate to the sides and backside of the MR sensor. A top-down view is shown where the top shield 15 having width w and height h is removed to reveal the shape of the underlying HM layer 20. The HM layer has a backside 20b having width w, and outer sides 20s2 each with height h from the ABS 18-18 to the HM layer backside. There is a junction shield 21 surrounding the MR sensor 2 at the ABS and extending a cross-track distance n of a plurality of hundreds of nm to a plurality of microns on each side of the center plane 44-44 to an inner side 20s1 of the HM layer. Each inner side 20s1 is aligned orthogonal to the ABS and has a height f (greater than height b of the MR sensor) from the ABS to an ABS facing side 20r of the HM layer. Side 20r has a cross-track width 2n and is parallel to the ABS. HM layer magnetization 20m is parallel to the ABS.

In FIG. 9, an ABS view is shown of a 1DMR scheme where the HM layer stabilization structure from the FIG. 8A layout is applied. Similar to the POR design in FIG. 1, there is a MR sensor comprised of layers 2d, 2f, 2h between top shield 15 and bottom shield 1. Preferably, junction shield 21 has a single ferromagnetic (FM) layer, or a plurality of FM layers that are ferromagnetically coupled with each having a magnetization in the (+) y direction, for example. In particular, HM layer provides more stabilization than achieved previously not only by supporting a steady magnetization 21m, but also by preventing magnetization 15m1 from flipping to an opposite direction from the desired direction that was preset during fabrication. Preferably, a portion of HM layer 20 and the junction shield 21 on each side of center plane 44-44 have a top surface 20t, 21t, respectively, that are coplanar with the top surface 2t of the MR sensor. Magnetization 20m maintains top shield magnetization 15m1 and junction shield magnetization 21m in a positive (y) direction, for example, to provide a stable longitudinal bias field to free layer 2f. In this embodiment, HM layer 20 and the junction shield each have a bottom surface formed on isolation layer 40.

Referring to FIG. 8B, a top-down view is depicted in an alternative embodiment wherein both of the first top shield 15 and second top shield 55 are stabilized by whole shield coupling with a HM layer. In this embodiment, the second top shield and overlying layers are removed to show the underlying second HM layer 30 in a 2DMR structure (or in a 3DMR structure). The second HM layer contacts essentially all of the second top shield bottom surface except in a region proximate to the sides and backside of the second MR sensor. The second HM layer has a backside 30b having width w, and outer sides 30s2 that extend from the ABS 18-18 to a height h at the second HM layer backside. A second junction shield 31 surrounds the second MR sensor 3 at the ABS and extends a cross-track distance n on each side of center plane 44-44 to an inner side 30s1 of the second HM layer. Each inner side 30s1 is aligned orthogonal to the ABS and has a height f (greater than height b of the second MR sensor) from the ABS to an ABS facing side 30r of the second HM layer. Side 30r has a cross-track width 2n and is parallel to the ABS. HM layer magnetization 30m is parallel to the ABS, and preferably in the same direction as magnetization 20m in the first HM layer.

Figure 10:
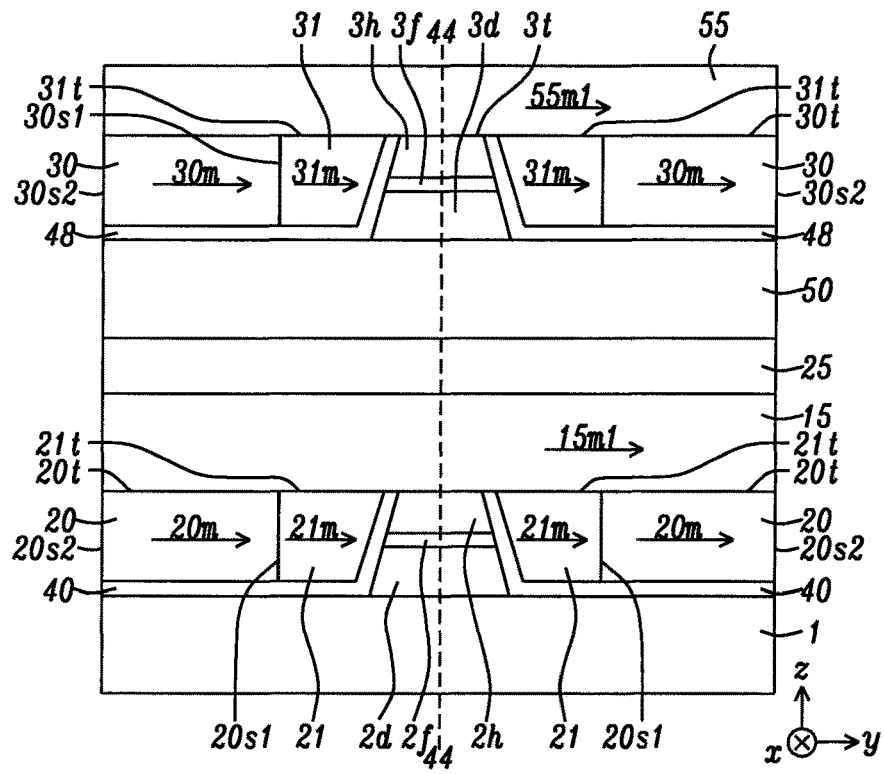
FIG. 10 is an ABS view of another embodiment of the present disclosure wherein the hard magnet layers in FIGS. 8A-8B are incorporated in a 2DMR structure.

Referring to FIG. 10, an ABS view is shown of a 2DMR scheme where the HM layer stabilization structure from FIG. 8A is included with the second HM layer stabilization structure from FIG. 8B. Effectively, the first embodiment illustrated in FIG. 2 is modified to replace outer portions of junction shields 21, 31 on each side of center plane 44-44 with HM layer 20, and 30, respectively. Furthermore, instead of HM coupling to a single top shield domain in previous embodiments, there is substantially more HM coupling with a top shield in this "whole shield coupling" embodiment. Junction shields 21, 31 may be comprised of a single magnetic layer. HM layer 20 provides stability to magnetization 21m and magnetization 15m1 while second HM layer 30 provides stability to magnetizations 31m and 55m1. Preferably, a portion of HM layer 30 and the junction shield 31 on each side of center plane 44-44 have top surfaces 30t, 31t, respectively, that are coplanar with the top surface 3t of the second MR sensor. Second HM layer 30 has a bottom surface formed on isolation layer 48.

The present disclosure also encompasses a method of forming a read head structure wherein a top shield is stabilized by a hard magnet layer disclosed herein. According to one embodiment shown from the ABS views in FIGS. 11-15, a series of steps is provided where a MR sensor with sidewalls is formed on a bottom shield, and then a junction shield is plated or deposited on the MR sensor sidewalls on each side of the center plane. A HM layer is deposited with an inner side that adjoins the junction shield and has essentially whole shield coupling with an overlying top shield that is formed in a subsequent step according to an embodiment described previously with regard to FIG. 9.

Figure 11:
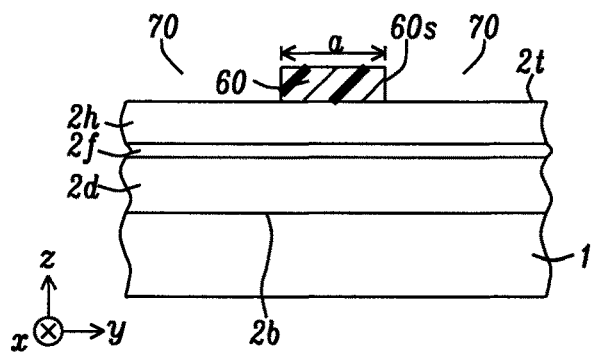
FIGS. 11-15 are ABS views that show a series of steps used to fabricate the read head structure in FIG. 9.

In FIG. 11, a first step in the fabrication process is depicted wherein a bottom shield 1 is formed on a substrate (not shown) by a plating method, for example. Thereafter, layers 2d, 2f, 2h in the first MR sensor stack are sequentially formed on a top surface of the bottom shield by a sputter deposition process. According to one embodiment that represents a bottom spin valve configuration, layer 2d is comprised of a lower seed layer, a middle antiferromagnetic (AFM) layer, a reference layer on the AFM layer and an upper non-magnetic spacer on a top surface of the reference layer, and layer 2h is a capping layer formed on free layer 2f. The non-magnetic spacer may be Cu in a GMR sensor or one or more metal oxides in a tunnel barrier layer in a TMR sensor. However, the present disclosure also encompasses other sensor designs that include at least a reference layer, free layer, and non-magnetic spacer between the reference layer and free layer wherein the reference layer may be part of layer 2d in a bottom spin valve configuration, or part of layer 2h in a well known top spin valve configuration. In a top spin valve configuration, layer 2d is a seed layer and layer 2h is comprised of a non-magnetic spacer contacting a top surface of free layer 2f, and a reference layer and capping layer sequentially formed on the non-magnetic spacer.

During the following step in the fabrication sequence, a photoresist layer is spin coated on the MR sensor top surface 2t, and is then patternwise exposed and developed by a conventional photolithography process to generate a pattern including a photoresist island 60 having a width a between sidewalls 60s in the cross-track direction. Width a corresponds to the desired cross-track width of the sensor top surface in the completed read head structure. The photoresist pattern typically includes a plurality of islands arranged in rows and columns from a top-down view that is not shown in order to focus on the key features in the drawing. From a top-down view (not shown), the island has a circular, elliptical, or polygonal shape depending on the desired shape of the MR sensor. There are openings 70 on either side of the photoresist island that expose substantial portions of top surface 2t. A portion of top surface 2t is also uncovered along a backside (not shown) of the photoresist island such that adjacent islands in the photoresist pattern are completely separated from each other.

Figure 12:
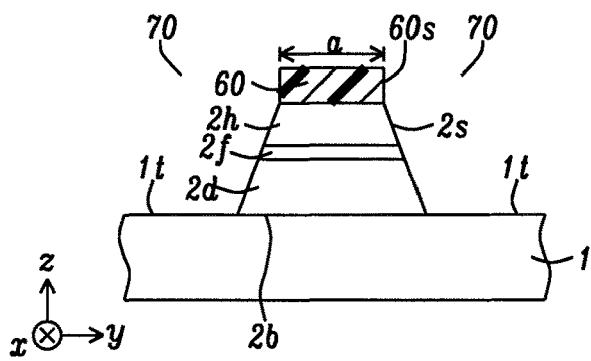

Referring to FIG. 12, a reactive ion etch (RIE) or ion beam etch (IBE) process is performed to transfer the shape of the photoresist island 60 through the MR sensor stack of layers. The etch process stops on a top surface 1t of the bottom shield. In some embodiments, the resulting sidewalls 2s are substantially vertical. In other embodiments, ions from the IBE or RIE process may be directed at a non-vertical angle with respect to top surface 1t such that a cross-track width of top layer 2h is less than a cross-track width for bottom layer 2d.

Figure 13:
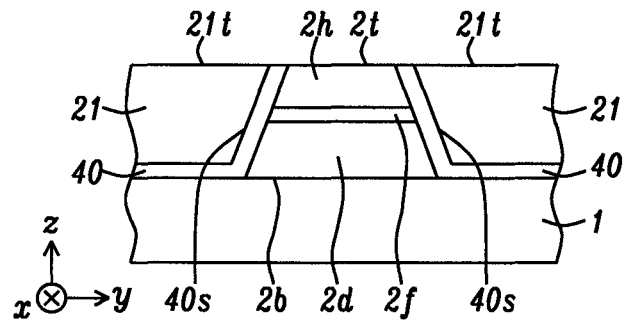

Referring to FIG. 13, an isolation layer 40 that is made of one or more non-magnetic materials is conformally deposited on top surface 1t and on sidewalls 2s by a plasma vapor deposition (PVD) process or the like. The isolation layer may have a lower metal oxide layer and an uppermost metal layer, for example, where the metal layer is employed to promote the plating of magnetic layers in subsequent steps. Next, the junction shield layer 21 is plated or deposited on a top surface 40s of isolation layer 40. A chemical mechanical polish (CMP) process may be performed to remove the photoresist island and provide a top surface 21t on the junction shield that is coplanar with top surface 2t of the MR sensor.

Figure 14:
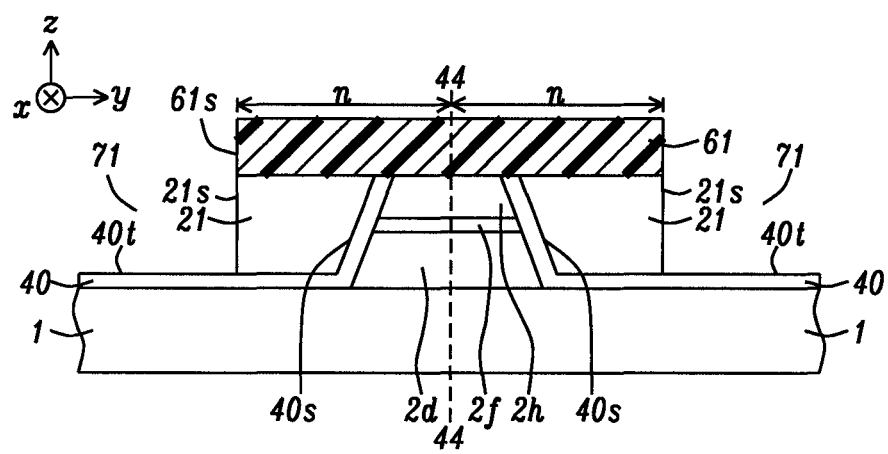

In FIG. 14, a second photoresist layer 61 is coated on the junction shield 21 and MR sensor top surface 2t, and is then patternwise exposed and developed to form sides 61s that are a cross-track distance n from center plane 44-44. An IBE or IBE step is carried out to remove portions of the junction shield that are not protected by the second photoresist layer, and stops on top surface 40t thereby generating sides 21s on the junction shield layer that are coplanar with sides 61s, and are separated from the center plane by the cross-track distance n at the ABS. Opening 71 is formed adjacent to sides 21s.

Figure 15:
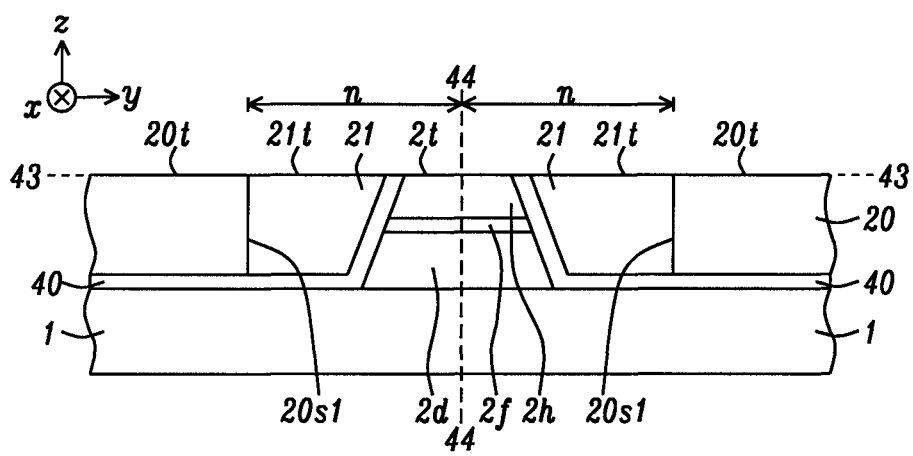

Referring to FIG. 15, HM layer 20 is plated or deposited on exposed portions of top surface 40t to a level at least up to plane 43-43 that includes top surface 2t of the MR sensor. A second CMP process may be performed to remove the second photoresist layer and form a top surface 20t on HM layer 20 that is coplanar with top surface 21t on junction shield 21, and top surface 2t on the MR sensor.

Thereafter, top shield 15 is formed on top surfaces 2t, 20t, 21t by a conventional process to yield the read head structure shown in FIG. 9. At this point, an anneal step may be performed to set the magnetization direction 15m1 in the top shield. Because of ferromagnetic coupling between the junction shield 21 and top shield, magnetization 21t is aligned in the same direction as 15m1. Subsequently, a temperature from RT to about 100° C. and an applied field with a magnitude of thousands of Oe is used to set magnetization 20m in the HM layer.

For a 2DMR scheme, isolation layer 25 is deposited on top shield 15, and then the process steps shown in FIGS. 11-15 are repeated to form a second MR sensor above the first MR sensor that is depicted in FIG. 10. In an alternative embodiment, a second HM layer 30 is omitted such that only the second junction shield 31 is employed adjacent to the second MR sensor. Thus, there is no HM layer to stabilize the second top shield 55 in the alternative embodiment.

In summary, we have disclosed a stabilized shield structure wherein a junction shield that provides longitudinal biasing to an adjacent free layer in a MR sensor is ferromagnetically coupled to a top shield that is in turn stabilized by a hard magnet layer adjoining a top or bottom surface of the top shield, or that replaces a magnetic domain in the top shield. Enhanced sensor performance in terms of high output sharpness (higher SNR) and lower BER is achieved with no significant cost additions compared with current fabrication schemes.

While this disclosure has been particularly shown and described with reference to, the preferred embodiment thereof, it will be understood by those skilled in the art that various changes in form and details may be made without departing from the spirit and scope of this disclosure.

We claim:
1. A magnetic read head structure, comprising:
(a) a first magnetoresistive (MR) sensor formed on a first bottom shield and having a first free layer with a first magnetization in a first direction, the first MR sensor has a planar sidewall that extends from a top surface thereof to the first bottom shield and the first MR sensor top surface has a first cross-track width (a) at an air bearing surface (ABS);
(b) a first top shield that contacts the first MR sensor top surface and has a second cross-track width (w) at the ABS where w>a, and a backside that is a first height (h) from the ABS, the first top shield has at least a first magnetic domain that is recessed from the ABS and is part of a closed magnetic loop that includes a second domain at the ABS with a second magnetization in the first direction;

(c) a first junction shield that is adjacent to the planar sidewall of the first MR sensor, and has a third magnetization in the first direction that is ferromagnetically coupled to the second domain in the first top shield, and provides a bias field in the first direction on the first free layer; and (d) a first hard magnet (HM) layer that is recessed from the ABS and with a fourth magnetization that is set or reset from room temperature to about 100° C., the fourth magnetization maintains the second magnetization in the first direction in the absence of an external magnetic field thereby providing enhanced stability to the first and third magnetizations, the first HM layer adjoins a top or bottom surface of the first top shield first domain and has a magnetization saturation×thickness (Mst) value substantially greater than that of the first top shield, and a cross-track width greater than w.

2. The magnetic read head structure of claim 1 wherein the first HM layer has a front side that is at a height of about ½ h from the ABS, and a backside that is greater than the first height from the ABS.

3. The magnetic read head structure of claim 1 wherein the first HM layer has a backside at the first height from the ABS.

4. The magnetic read head structure of claim 1 wherein the first HM layer has a square, trapezoidal, or rectangular shape from a top-down view.

* * * * *